United States Patent
Ho et al.

(10) Patent No.: US 9,473,947 B2
(45) Date of Patent: Oct. 18, 2016

(54) MACRO NETWORK OPTIMIZATION WITH ASSISTANCE FROM FEMTO CELLS

(71) Applicant: AT&T Mobility II LLC, Atlanta, GA (US)

(72) Inventors: Ming-Ju Ho, Alpharetta, GA (US); Patrick Mascarenhas, Atlanta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 119 days.

(21) Appl. No.: 14/181,152

(22) Filed: Feb. 14, 2014

(65) Prior Publication Data
US 2014/0160973 A1    Jun. 12, 2014

Related U.S. Application Data

(62) Division of application No. 13/194,443, filed on Jul. 29, 2011, now Pat. No. 8,693,397.

(51) Int. Cl.
| | |
|---|---|
| *H04W 16/16* | (2009.01) |
| *H04W 24/02* | (2009.01) |
| *H04W 52/24* | (2009.01) |
| *H04L 1/00* | (2006.01) |
| *H04W 72/08* | (2009.01) |
| *H04W 74/00* | (2009.01) |
| *H04W 84/00* | (2009.01) |
| *H04W 88/08* | (2009.01) |
| *H04W 84/04* | (2009.01) |
| *H04B 7/08* | (2006.01) |

(52) U.S. Cl.
CPC ............ *H04W 16/16* (2013.01); *H04L 1/0001* (2013.01); *H04L 1/0026* (2013.01); *H04W 24/02* (2013.01); *H04W 52/244* (2013.01); *H04W 52/245* (2013.01); *H04W 52/247* (2013.01); *H04W 72/085* (2013.01); *H04B 7/0834* (2013.01); *H04L 2001/0092* (2013.01); *H04W 74/00* (2013.01); *H04W 84/00* (2013.01); *H04W 84/045* (2013.01); *H04W 88/08* (2013.01)

(58) Field of Classification Search
CPC .......... H04W 52/243–52/245; H04W 52/247; H04W 72/085; H04W 16/16; H04W 24/02; H04W 88/08; H04W 7/0834; H04L 1/0001; H04L 1/0026; H04L 2001/0092
See application file for complete search history.

(56) References Cited

U.S. PATENT DOCUMENTS

| | | |
|---|---|---|
| 2006/0068849 A1 | 3/2006 | Bernhard et al. |
| 2007/0097939 A1 | 5/2007 | Nylander et al. |
| 2009/0092097 A1 | 4/2009 | Nylander et al. |

(Continued)

OTHER PUBLICATIONS

Office Action dated Jun. 4, 2013 for U.S. Appl. No. 13/194,443, 28 pages.

(Continued)

*Primary Examiner* — Habte Mered
(74) *Attorney, Agent, or Firm* — Amin, Turocy & Watson, LLP

(57) ABSTRACT

A received signal strength indicator returned from a femto cell is employed to optimize a multiple access wireless communication network. For example, a method operable in a wireless communications network is disclosed. The method comprises receiving a received signal strength indicator from a femto cell situated in a geographical area within a multiple access wireless communication network, and optimizing the multiple access wireless communication network as a function of the received signal strength indicator.

20 Claims, 15 Drawing Sheets

(56) References Cited

U.S. PATENT DOCUMENTS

| | | | |
|---|---|---|---|
| 2009/0141623 A1* | 6/2009 | Jung et al. | 370/229 |
| 2009/0296635 A1* | 12/2009 | Hui | H04W 48/10 370/328 |
| 2010/0027469 A1 | 2/2010 | Gurajala et al. | |
| 2010/0062723 A1 | 3/2010 | Tao et al. | |
| 2010/0120394 A1 | 5/2010 | Mia et al. | |
| 2010/0120447 A1* | 5/2010 | Anderson et al. | 455/456.1 |
| 2010/0144355 A1 | 6/2010 | Jin et al. | |
| 2010/0144366 A1 | 6/2010 | Ishii et al. | |
| 2010/0151857 A1 | 6/2010 | Brisebois et al. | |
| 2010/0151858 A1 | 6/2010 | Brisebois et al. | |
| 2010/0203891 A1 | 8/2010 | Nagaraja et al. | |
| 2010/0216486 A1* | 8/2010 | Kwon | H04W 72/0426 455/452.2 |
| 2010/0265867 A1 | 10/2010 | Becker et al. | |
| 2011/0003559 A1* | 1/2011 | Morita | H04J 11/0056 455/67.14 |
| 2011/0003597 A1* | 1/2011 | Budic et al. | 455/450 |
| 2011/0009065 A1* | 1/2011 | Carter | H04W 24/08 455/63.1 |
| 2011/0009147 A1* | 1/2011 | Morita et al. | 455/509 |
| 2011/0021240 A1 | 1/2011 | Hiltunen et al. | |
| 2011/0111749 A1 | 5/2011 | Kim et al. | |
| 2011/0116480 A1 | 5/2011 | Li et al. | |
| 2011/0170432 A1 | 7/2011 | Grokop et al. | |
| 2011/0177808 A1 | 7/2011 | Grokop et al. | |
| 2011/0212731 A1 | 9/2011 | Lee et al. | |
| 2011/0223923 A1 | 9/2011 | Cho et al. | |
| 2011/0256878 A1* | 10/2011 | Zhu et al. | 455/450 |
| 2011/0256890 A1 | 10/2011 | Polakos | |
| 2012/0094665 A1 | 4/2012 | Soliman et al. | |
| 2012/0100863 A1 | 4/2012 | Klatt et al. | |
| 2012/0196543 A1* | 8/2012 | Andersson et al. | 455/67.11 |
| 2012/0231826 A1* | 9/2012 | Koorapaty | H04W 16/16 455/509 |
| 2012/0238268 A1 | 9/2012 | Radulescu et al. | |
| 2012/0252463 A1 | 10/2012 | Zou et al. | |
| 2012/0264450 A1 | 10/2012 | Kangas et al. | |
| 2013/0102309 A1 | 4/2013 | Chande et al. | |
| 2013/0122917 A1 | 5/2013 | Yavuz et al. | |
| 2013/0171985 A1* | 7/2013 | Carter | H04W 52/24 455/423 |

OTHER PUBLICATIONS

Notice of Allowance dated Nov. 18, 2013 for U.S. Appl. No. 13/194,443, 22 pages.

* cited by examiner

MACRO NETWORK OPTIMIZATION WITH ASSISTANCE FROM FEMTO CELLS

RELATED APPLICATION

The present application is a divisional of U.S. patent application Ser. No. 13/194,443, filed Jul. 29, 2011, and entitled "MACRO NETWORK OPTIMIZATION WITH ASSISTANCE FROM FEMTO CELLS," the entire content of which is incorporated herein by reference.

TECHNICAL FIELD

The present application relates generally to wireless communications networks, and more specifically to employing a received signal strength indicator returned from a Femto cell to optimize a multiple access wireless communication network.

BACKGROUND

Multiple access wireless communication systems, such as mobile radio communications systems, periodically require optimization to improve performance, capacity, and customer satisfaction. Recently, femto cells have been introduced by major multiple access wireless communication systems providers/carriers for deployment inside customer buildings to further improve in-building data and voice coverage.

Femto cells are specifically designed for commercial buildings with enterprise customers in mind Femto cells generally are low power nodes with functionality that is similar to base transceiver stations (e.g., NodeBs). Since allocated frequency spectrum is at a premium and/or is finite, femto cells typically do not have dedicated frequency allocations. Femto cells generally share frequency spectrum with the greater multiple access wireless communication system (e.g., macro network) within which they are located. Accordingly, a certain degree of coverage overlap between the multiple access wireless communication as a whole and individual Femto cells is inevitable. Nevertheless, too much overlap between the multiple access wireless communication system in its entirety and individual Femto cells can cause degradation in terms of network performance and capacity due to interference between the macro network and the femto cells extant within the macro network.

While Femto cells typically have lower priority in relation to other components that form the multiple access wireless communication system and generally reduce their transmitted power in response to the signal strength emanating for the macro network becoming overwhelming, such reduction of transmitted power by femto cells is limited due to the cells' dynamic range.

The above-described deficiencies of today's wireless communications systems are merely intended to provide an overview of some of the problems of conventional systems, and are not intended to be exhaustive. Other problems with the state of the art and corresponding benefits of one or more of the various non-limiting embodiments may become further apparent upon review of the following detailed description.

DETAILED DESCRIPTION

Figure 1:
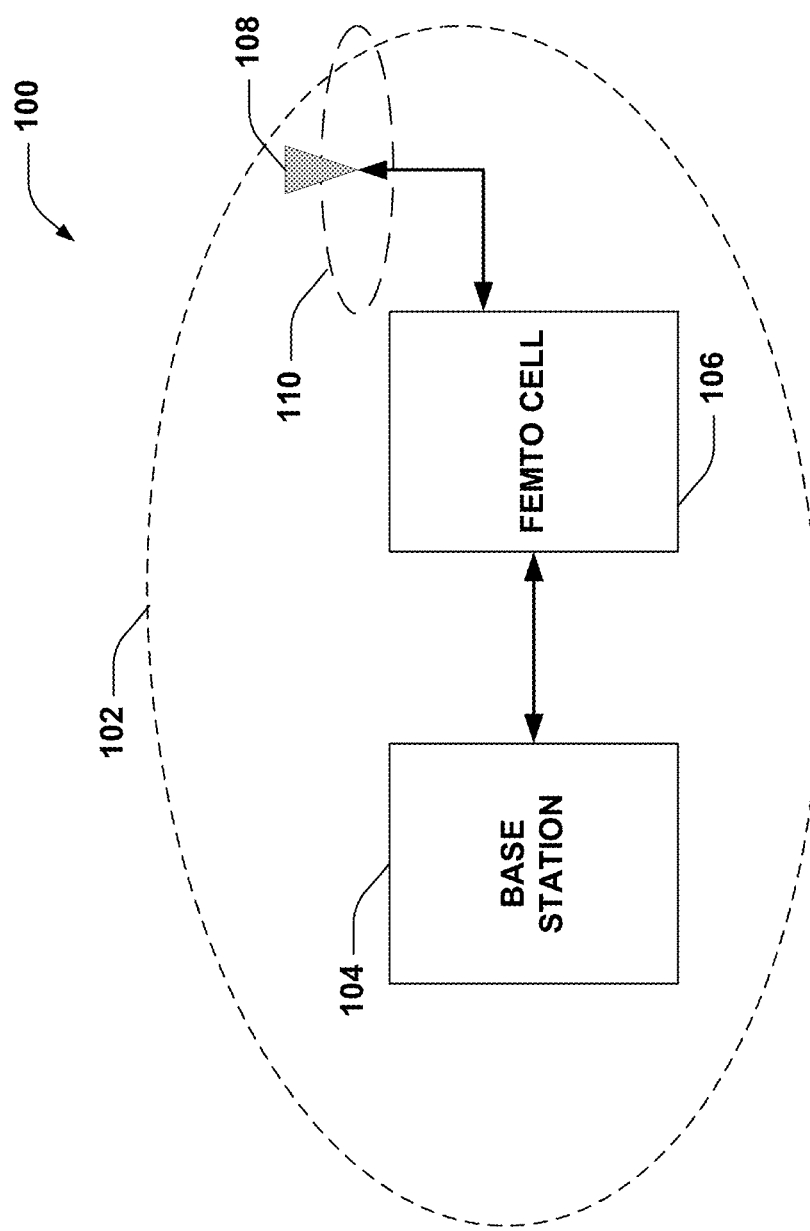
FIG. 1 is a block diagram of a system that performs macro network optimization using deployed femto cells in order to reduce or mitigate interference in coverage areas served by the femto cells.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Further, terms like "user equipment," "mobile device," "mobile," "subscriber station," "access terminal," "terminal," "handset," and similar terminology, generally refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "cell site," "Node B," "evolved Node B" and other outdoor environment devices, can be utilized interchangeably in the subject application. Similarly, terms such as "femtocell", "femto," "home Node B", "micro cell" and other indoor environment devices can be used interchangeably as well. In either outdoor or indoor cases, such devices can refer to a wireless network component or appliance that serves and receives data, control, voice, video, sound, gaming, or substantially any data-stream or signaling-stream from a set of subscriber mobile devices. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network," "communications network," "network" and the like are used interchangeable in the subject application, when context for any of these term utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The following description and the annexed drawings set forth in detail certain illustrative aspects of the disclosed subject matter. These aspects are indicative, however, of but a few of the various ways in which the principles of the disclosed subject matter may be employed and the disclosed subject matter is intended to include all such aspects and their equivalents.

In accordance with one or more embodiments, disclosure is made of a method, comprising receiving a received signal strength indicator from a femto cell situated in a geographical area within a multiple access wireless communication network; and altering the multiple access wireless communication network as a function of the received signal strength indicator.

In accordance with further embodiments, disclosure is made of a system operable in a wireless communication network, comprising a component configured to detect a suboptimal degree of interference from a multiple access wireless communication network, wherein the interference inhibits a femto cell extant in the multiple access wireless communication network from modifying its associated coverage area, and a further component configured to transmit a warning message that indicates that relocation of the femto cell is required.

In accordance with yet a further embodiment, disclosure is made of a further system, comprising a first component configured to solicit a received signal strength indicator from a femto cell positioned within a geographical area shadowed by transmissions from a multiple access wireless communication network, and a second component configured to adjust an antenna electrical tilt mechanism controlled by a base station situated in the multiple access wireless communication network in response to the received signal strength indicator.

With reference to the Figures, FIG. 1 illustrates a system 100 that performs macro network optimization using deployed femto cells in order to reduce or mitigate interference in coverage areas served by the femto cells. To this end, system 100 can include a multiple access wireless communication system 102 than can comprise multiple cells, wherein each cell can include access points that can be associated with multiple sectors. The multiple sectors can be formed by groups of antennas each responsible for communication with access terminals in a portion of the cell. Each cell can also include several access terminals which can be in communication with one or more sectors associated with each access point. Further, a controller can also be coupled to each cell, wherein the controller can provide connections to multiple networks, e.g., Internet, other packet based networks, or circuit switched voice networks that can provide information to, and from, the access terminals in communication with the cells of the multiple access wireless communication system 102. Typically, the controller can be coupled to a scheduler that can schedule transmission from and to access terminals currently resident in multiple access wireless communication system 102. It should noted in the context of the scheduler, the scheduler can reside in each individual cell, each sector of a cell, or a combination thereof.

As used herein, an access point can be a fixed station used for communicating with access terminals and can also be referred to as, and include some or all the functionality of, a base station, a Node B, or some other terminology. Further, an access terminal can also be referred to as, and include some or all the functionality of, a user equipment (UE), a wireless communication device, terminal, a mobile station or some other terminology. Typical examples of access terminals can be cellular phones, smart phones, laptops, handheld communication devices, handheld computing devices, satellite radios, global positioning systems, PDSs, and/or any other suitable device for communication over a wireless communication system such as multiple access wireless communication system 102.

As depicted, multiple access wireless communication system 102 can include base station 104 that can be communicatively coupled to femto cell 106. As previously noted, base station 104 is a station employed to communicate with access terminals that fall within the service purview of base station 104. Further, as will be appreciated by those of ordinary skill, femto cell 106, in conjunction with an associated antenna 108, can have a similar functionality to that of base station 104 though the ambit of its coverage area, illustrated as coverage area 110, can be more curtailed than that of base station 104, typically restricted to the floor plan of a commercial building or structure, such as an office building, warehouse, or factory. Thus, as will be further appreciated by persons of ordinary skill, base station 104 with its greater service coverage area can strategically be situated so as to provide the greatest coverage area possible, whereas femto cell 106 can be positioned to provide a service coverage area within a commercial building, for example.

Base station 104 can continuously, periodically, or on demand, transmit a traditional pilot signal/beacon or other prearranged or predetermined signal (e.g., a special signal) to femto cell 106, whereupon femto cell 106 can respond to the pilot signal/beacon or prearranged or predetermined signal with a received signal strength indicator (RSSI) and/or other resource reservation control indicia, such as a quality of service (QoS) indicator, that provides base station 104 the ability to appropriately prioritize different applications, users, or data flows, and/or to guarantee a certain level of performance to a particular data flow. For example, a required bit rate, delay, jitter, packet dropping probability, and/or bit error rate can be guaranteed. Further, base station 104 can also employ the received signal strength indicator and/or other resource reservation control indicia to ascertain whether there exists a strong coverage overlap between the coverage area provided by base station 104 and the coverage area (e.g., coverage area 110) provided by femto cell 106.

Where base station 104 determines that an overlap in coverage areas exists between itself and femto cell 106, base station 104 can take steps to adjust its coverage area so as to cease or minimize shadowing areas also covered by femto cell 106. Acts that can be undertaken by base station 104 to cease or minimize shadowing coverage areas also serviced by femto cell 106 can include adjusting the azimuth of antenna arrays associated with base station 104 through use of antenna remote electrical tilt (RET) mechanisms and adjusting the transmitted power and/or frequency allocations. For example, base station 104 can adjust the transmitted power utilized in the cells under its control and/or the transmitted power employed within individual sectors in the cells under its control. Similarly, base station 104 can also appropriately modify frequency assignments, and antenna azimuths.

As stated above, femto cell 106 can respond to a pilot signal/beacon or other prearranged or predetermined signal transmitted from base station 104 by returning to base station 104 a received signal strength indicator and/or other resource reservation control indicia which base station 104 can subsequently utilize to perform adjustments to the macro network in order to reduce the amount of interference, due to coverage overlap between the macro network and the coverage area provided by femto cell 106, within the system. In order to effectively respond to the transmission of the pilot signal/beacon emitted from base station 104, femto cell 106 can be configured to continuously and/or periodically monitor and detect for the transmission of the pilot signal/beacon from base station 104. When femto cell 106 detects that a pilot signal/beacon transmitted by base station 104 femto cell 106 can marshal the necessary information (e.g., received signal strength indicator and/or other resource reservation control indicia) into a report and dispatch the report back to base station 104.

Figure 2A:
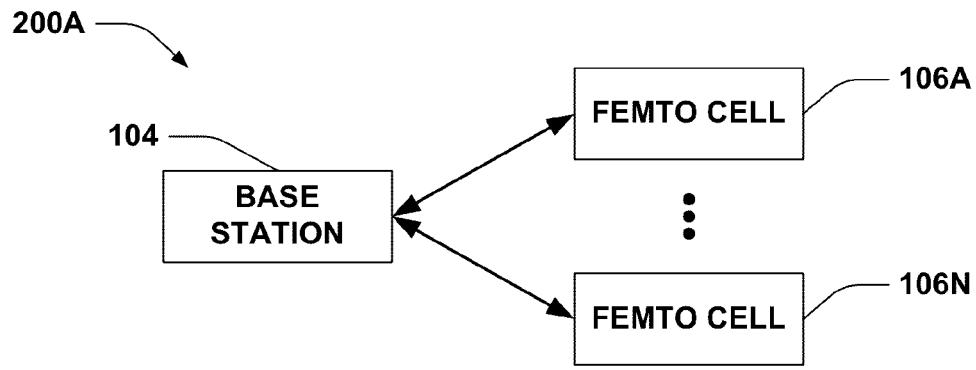
FIG. 2A provides a block diagram of a single base station in communication with multiple femto cells.

Turning now to FIG. 2A which depicts a single base station 104 in communication with multiple femto cells 106A-106N. In this embodiment, base station 104 can broadcast a pilot signal/beacon or other prearranged or predetermined signal to multiple femto cells 106A-106N, or base station 104 can simultaneously, or in near contemporaneity, transmit the pilot signal/beacon or other prearranged or predetermined signal to each of the femto cells 106A-106N. The femto cells 106A-106N, in accordance with an embodiment, can be clustered in a single geographical area. For example, femto cells 106A-106N can be situated on multiple floors in an office building, or can be distributed throughout a warehouse or factory building. Alternatively, in accordance with a further embodiment, femto cells 106A-106N can be positioned in disparate geographical areas of the wider multiple access wireless communication network. For instance, femto cell 106A can be located in an office building in a city at one peripheral edge of the multiple access wireless communication network's coverage range while femto cell 106N can be situated in a warehouse in a city at the opposite peripheral edge of the multiple access wireless communication network's coverage range. In response to receiving the transmitted pilot signal/beacon from base station 104, each femto cell 106A-106N can report back to transmitting base station 104 its individuated received signal strength indicator metrics together with other relevant resource reservation control indicia that base station 104 can employ to adjust and optimize the macro network.

Figure 2B:
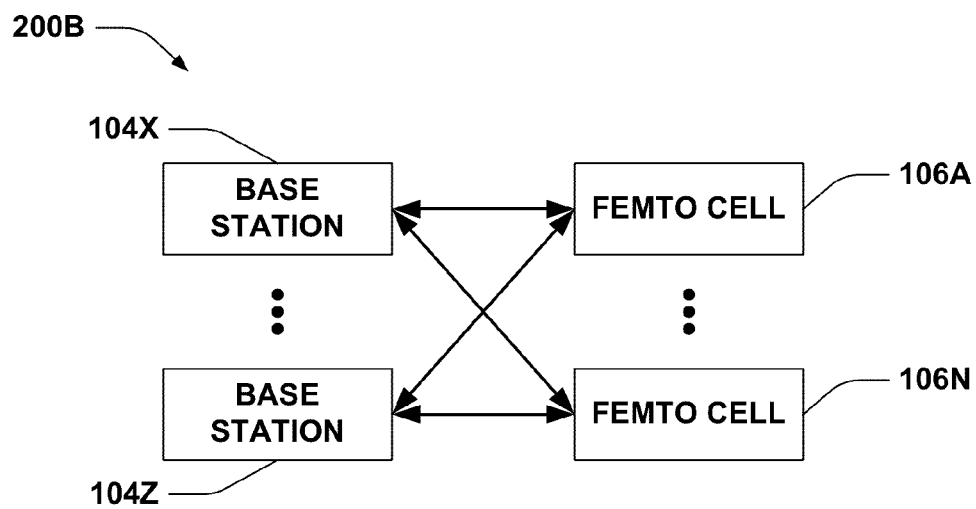
FIG. 2B depicts multiple base stations in communication with multiple femto cells.

In connection with FIG. 2B, multiple base stations 104X-104Z are illustrated as being in communication with multiple femto cells 106A-106N. As noted above, femto cells 106A-106N can be clustered within a single geographical area or each femto cell 106A-106N can be variously dispersed in many diverse geographical areas. It should be noted in this regard however that two or more femto cells 106A-106N can be located (co-located) within the same geographical area without departing from the scope and intent of this disclosure. In a manner similar to that described in the context of the location and dispersion of the multiple femto cells 106A-106N, multiple base stations 104X-104Z can also be strategically clustered within geographical areas and/or can be variously and advantageously positioned in diverse geographical areas throughout the multiple access wireless communication network. In this instance, where multiple base stations 104X-104Z transmit or broadcast pilot signals/beacons or other prearranged or predetermined signals simultaneously, or in near or close temporal proximity with one another, to femto cells 106A-106N in order to instigate femto cells 106A-106N to send back their respective received signal strength indicators and/or other resource reservation control indicia, the femto cells 106A-106N can in response return an aggregated received signal strength indicator or a total received signal strength indicator as well as other relevant resource reservation control indicia.

Figure 3:
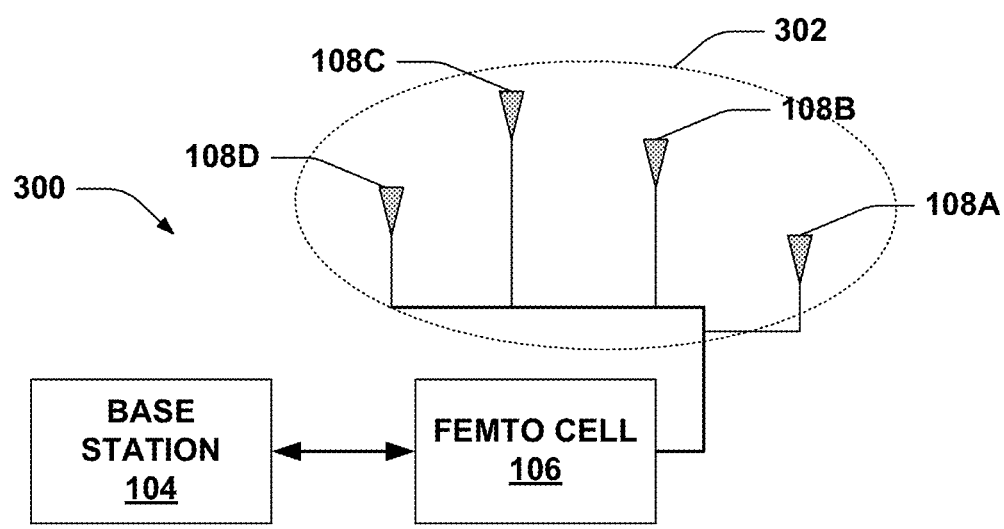
FIG. 3 illustrates a communicatively coupled base station and femto cell, wherein the femto cell is associated with a distributed antenna array.

FIG. 3 illustrates a communicatively coupled base station 104 and femto cell 106, wherein femto cell 106 is associated with a distributed antenna array 302 comprising antennas 108A, 108B, 108C, and 108D. Generally, distributed antenna array 302 can be utilized to extend the coverage area of the femto call 106 to other areas of a commercial building. For instance, antenna 108A can be placed on the $57^{th}$ Floor, antenna 108B placed on the $47^{th}$ Floor, antenna 108C on the $37^{th}$ Floor, and antenna 108D placed on the $27^{th}$ Floor of an Office Tower. Alternatively, where a business is spread out over a wide area, such as a business campus, distributed antenna array 302, and its constituent antennas, associated with femto cell 106 can be distributed at the northern, eastern, southern, and western peripheral boundaries of the business campus. As will be realized by those of ordinary skill each antenna included in distributed antenna array 302 can circumscribe or delineate a distinct coverage area. Further, as will also comprehended by those of ordinary skill in the art, the coverage areas circumscribed or delineated by each antenna associated with distributed antenna array 302 can also be subject to degrees of overlap which can cause interference. This interference caused by such overlaps can be controlled, minimized, or ameliorated by facilities provided by femto cell 106. It should be noted at this juncture that while only four antennas (e.g., 108A, 108B, 108C, and 108D) have been depicted as comprising distributed antenna array 302, a greater or lesser number of antennas can be included in distributed antenna array 302 without departing from the intent and scope of this disclosure.

Figure 4:
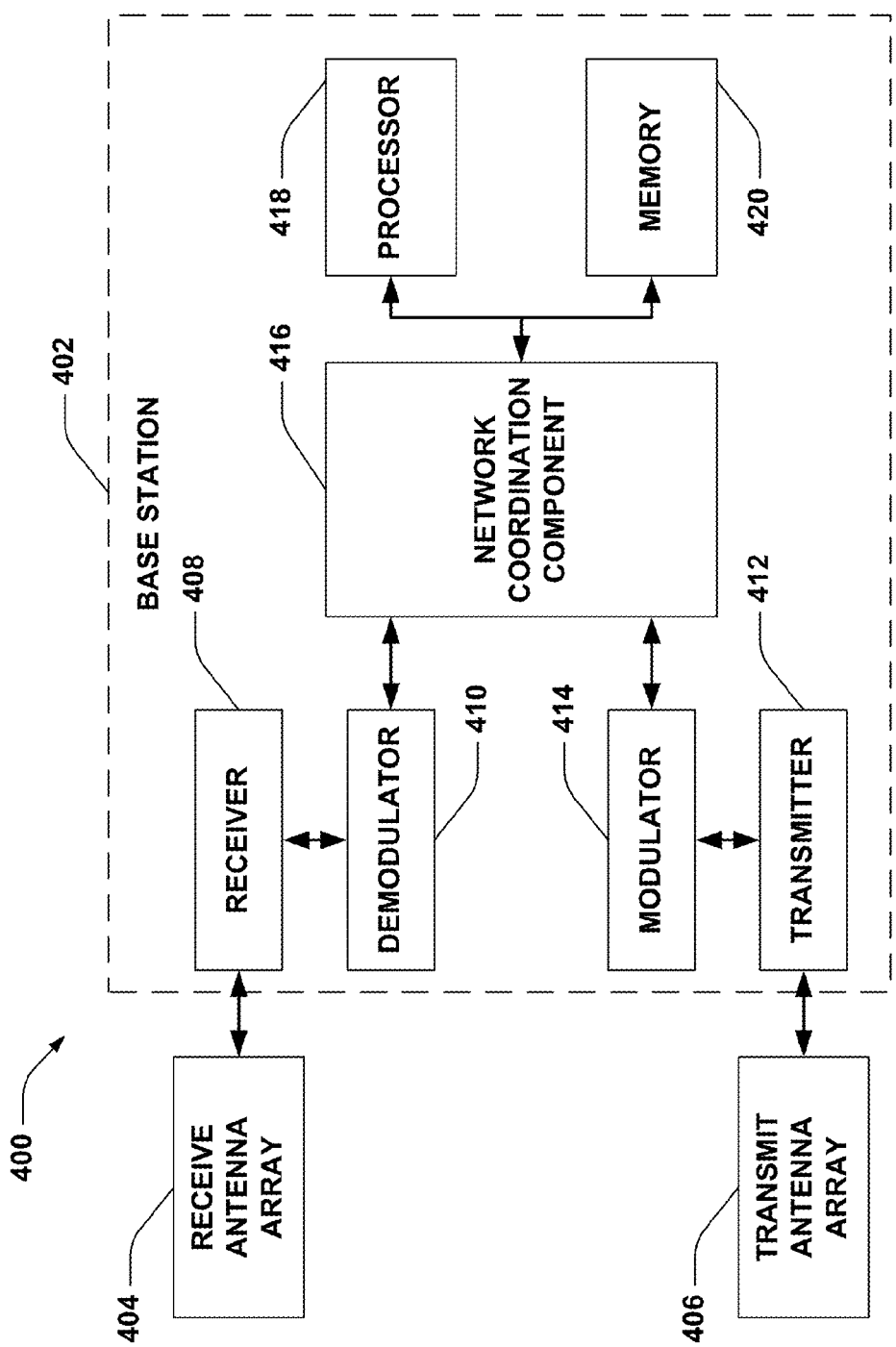
FIG. 4 is a block diagram of the inner workings of an illustrative base station.

FIG. 4 provides illustration 400 of the inner workings of base station 402. Base station 402 has similar functionality to base station 104 previously described above. Base station 402 in accordance with an embodiment can include a transmission side and a receiver side. The receiver side of base station 402 can include receiver 408 that can receive signals from one or more femto cell (e.g., femto cell 106) through a plurality of receive antennas provided by receive antenna array 404. Receiver 408 can receive information from receive antenna array 404 and is operatively associated with demodulator 410 that demodulates the received information. Demodulated symbols can be analyzed by a processor 418 that can be a processor dedicated to analyzing information received by receiver 408 and/or generating information for transmission by transmitter 412, a processor that controls one or more components of base station 402, and/or a processor that both analyzes information received by receiver 408, generates information for transmission by transmitter 412, and controls one or more components of base station 402, and which is coupled to a memory 420 that stores data to be transmitted to or received from femto cell 106, and/or any other suitable information related to performing the various actions and functions set forth herein. Processor 418 is further coupled to network coordination component 416 that, as will be described subsequently, reduces interference to coverage areas served by femto cells.

The transmission side of base station 402 can include transmitter 412 that transmits to the one or more femto cells (e.g., femto cells 106A-106N) through transmit antenna array 406. Typically, transmitter 412 is coupled to modulator 414 that can multiplex frames for transmission by transmitter 412, via transmit antenna array 406, to femto cell 106A-106N. Although depicted as being separate from processor 418, it is to be appreciated that network coordination component 416 can be part of processor 418 or a number of processors (not shown).

Network coordination component 416 can typically be employed to optimize or adjust a multiple access wireless communication system or network (e.g., multiple access wireless communication system 102) by reducing interference to geographical areas serviced by femto cells. Network coordination component 416 accomplishes the foregoing by transmitting or broadcasting, periodically, at random time intervals, continuously, or on-demand, a pilot signal/beacon (or some other predetermined or prearranged signal) comprehended by femto cells as being a command or direction that instigates femto cells, in response to detecting or identifying the pilot signal/beacon, to report to the transmitting or broadcasting base station 402 (and network coordination component 416 in particular) a received signal strength indicator and/or other related resource reservation control indicia, such as quality of service indicia. On receipt of the received signal strength indicator and/or other related and pertinent resource reservation control indicia, network coordination component 416, based at least on the received signal strength indicator and/or other related and pertinent resource reservation control indicia, can determine whether or not there exists coverage overlap between the multiple access wireless communication network (or a geographical portion/segment that includes the femto cell) and the reporting femto cell (e.g., femto cell 106).

When network coordination component 416 ascertains, based at least on the received signal strength indicator and/or other related and pertinent resource reservation control indicia, that a coverage overlap exists between the multiple access wireless communication network 102 and coverage areas serviced by femto cell, network coordination component 416 can adjust transmission parameters, such as transmission power, frequency allocations/assignments, antenna tilting and azimuth, in order to reduce the interference caused by the multiple access wireless communication network coverage areas intruding into geographic coverage areas presently serviced by the responding femto cell.

Additionally, network coordination component 416 on receipt of the received signal strength indicator and/or other related quality information (e.g., resource reservation control indicia) can interact or interface with other optimization tools, such as, operations support systems, self optimizing network elements, propagation planning tools, automatic cell planning facilities, and the like, in order to ameliorate or attenuate the interference caused by the multiple access wireless communication network intruding into the coverage areas serviced by an operational femto cell.

Figure 5:
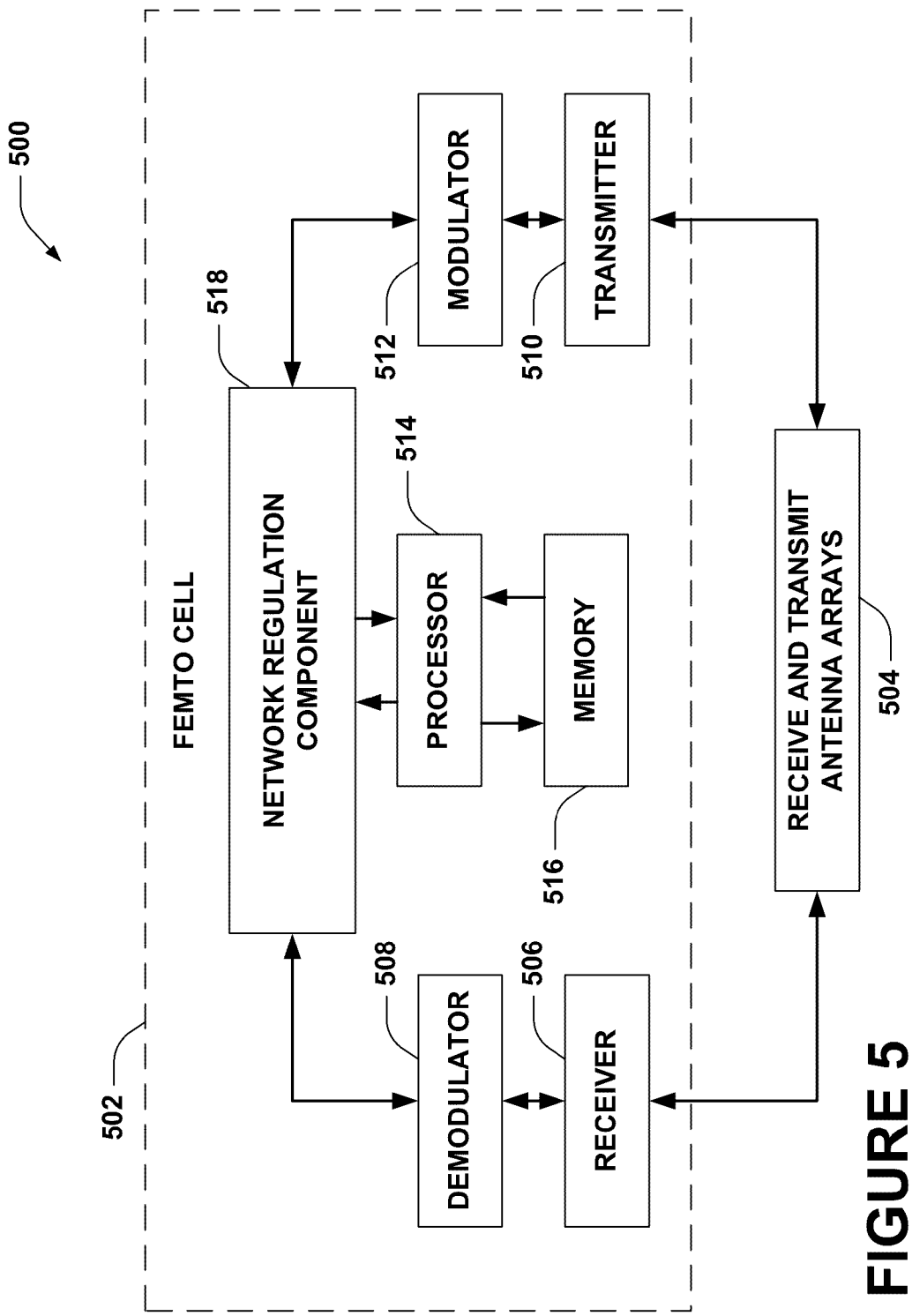
FIG. 5 depicts in block form a system that facilitates and/or effectuates macro network optimization using deployed femto cells in order to reduce or mitigate interference in coverage areas served by the femto cells.

FIG. 5 depicts a system 500 that facilitates and/or effectuates macro network optimization using deployed femto cells in order to reduce or mitigate interference in coverage areas served by the femto cells. System 500 comprises femto cell 502 with a receiver 506 that receives signals through receive and transmit antenna arrays 504 from one or more base stations (e.g., base station 104X-104Z). Femto cell 502 also includes a transmitter 510 that transmits, through receive and transmit antenna arrays 504, to base stations (e.g., base stations 104X-104Z) extant within the coverage area provided by multiple access wireless communication system 102. Receiver 506 can receive information from receive and transmit antenna arrays 504 and is operatively associated with demodulator 508 that modulates received information. Demodulated symbols are analyzed by a processor 514 that can be a processor dedicated to analyzing information received by receiver 506 and/or generating information for transmission by transmitter 510, a processor that controls one or more components of femto cell 502, and/or a processor that both analyzes information received by receiver 506, generates information for transmission by transmitter 510, and controls one or more components of femto cell 502, and which is coupled to a memory 516 that stores data to be transmitted to or received from one or more base stations (e.g. base stations 104X-104Z). Processor 514 is further coupled to a network regulation component 518 that, as will be described infra, facilitates and/or effectuates macro network optimization through use of retuned signal strength indicators and/or other quality information retuned by femto cells in order to reduce or mitigate interference in coverage areas served by the femto cells. Modulator 512 can multiplex a frame for transmission by transmitter 510 through receive and transmit antenna arrays 504 to one or more base stations that can exist within the coverage area of multiple access wireless communications network 102. Although depicted as being separate from processor 514, it is to be appreciated that network regulation component 518 can be part of processor 514 or a number of processors (not shown).

Network regulation component 518 can, upon receipt of a pilot signal/beacon (or some other predetermined or prearranged signal) from a base station can report back to the transmitting or broadcasting base station its received signal strength indicator. Additionally and/or alternatively, network regulation component 518 can report back other resource reservation control indicators or other quality information that the receiving base station can utilize in order to prevent interference between the multiple access wireless communication network coverage area over which the receiving base station has control and the coverage area circumscribed and controlled by femto cell at issue. Network regulation component 518 accomplishes the foregoing by continuously, periodically, or at random time intervals, monitoring for a pilot signal/beacon emanating from a base station. When network regulation component 518 detects or recognizes the pilot signal/beacon as an instigating or initiating pilot signal/beacon, network regulation component 518 can cause a received signal strength indicator and/or other quality information to be dispatched back to the requesting base station (e.g., the transmitting or broadcasting base station), whereupon the received signal strength indicator and/or quality information from the femto cell can be employed by the base station to attenuate or ameliorate the effects of the base station's transmissions into the coverage areas service by the femto cell to which network regulation component 518 is affiliated.

Additionally, in an embodiment, network regulation component 518 in conjunction with a timer (e.g., watchdog timer) can determine the near temporal proximity or contemporaneity of receipt of pilot signal/beacons transmitted or broadcast by a plurality of base stations. When network regulation component 518 determines that a plurality of base stations have simultaneously or in near contemporaneity have transmitted or broadcast pilot signals/beacons initiating the femto cell to dispatch in return received signal strength indicators and/or other related quality information, network regulation component 518 can dispatch and aggregated received signal strength indicator and/or related quality information that the requesting base stations can employ to adjust that transmission parameters so as to reduce the degree of interference caused to the coverage areas serviced by femto cell.

Further, since femto cells can be associated with distributed antenna arrays (e.g. distributed antenna array 302), network regulation component 518 can continuously, periodically, on demand, all at random time intervals, monitor each coverage area delineated by a particular antenna included in the distributed antenna array 302 to ascertain its respective received signal strength indicator and other quality metrics. This individuated received signal strength indicator and/or other quality metrics can be compiled by network regulation component 518 and dispatched to the transmitting or broadcasting base station when an initiating pilot signal/beacon is detected.

Figure 6:
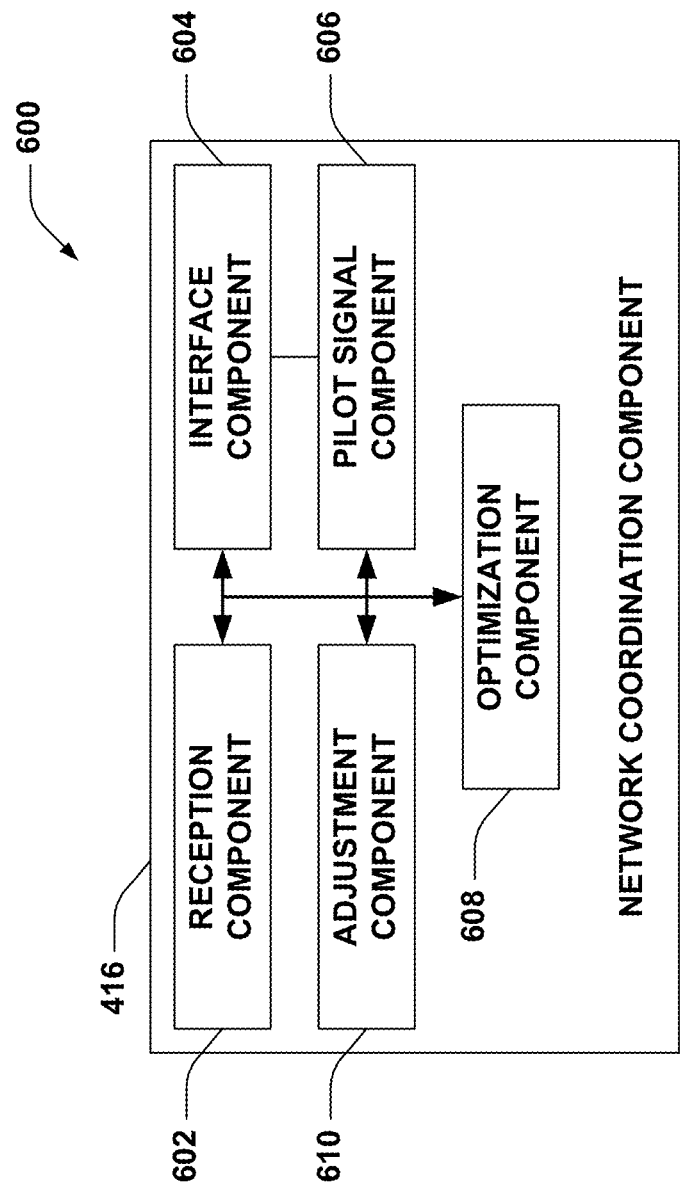
FIG. 6 depicts a block diagram of an illustrative network coordination component.

FIG. 6 illustrates 600 network coordination component 416 in further detail. Network coordination component 416 can include reception component 602 that can receive received signal strength indicators and other quality information (e.g. resource reservation control indicia) from femto cells that have been prompted or instructed to return such information through dispatch (e.g., transmission and/or broadcast) of a pilot signal/beacon (or other predetermined or prearranged signal). As has been noted above, on receipt of the received signal strength indicator and/or ancillary quality metrics, the base station within which network coordination component 416 is included, can perform actions to modify transmission characteristics of the multiple access wireless communication network or system to which the base station forms an integral part. Such modification of transmission characteristics can include adjusting antenna azimuths, modifying transmission powers, or changing frequency allocations in order to reduce or minimize interference caused by coverage overlaps between the areas serviced by the multiple access wireless communication system or network and the areas serviced by a responding femto cell.

Further, network coordination component 416 can include interface component 604 that allows network coordination component 416 to interact and utilize facilities and functionalities provided by other optimization tools, such as, operations support systems, self optimizing network elements, propagation planning tools, automatic cell planning facilities, and the like.

Network coordination component 416 can further include pilot signal component 606 that can be configured to continuously, periodically, at time intervals randomly selected, or on demand, cause the base station within which network coordination component 416 is incorporated to broadcast, transmit, or otherwise dispatch, wirelessly or through a wired means, a pilot signal/beacon (or other prearranged or predetermined signal) to femto cells in order to elicit from the femto cells a response that includes at least the received signal strength indicator or other associated quality information.

Network coordination component 416 can also include optimization component 608 that, in response to a received signal strength indicator and/or other quality information received from a femto cell, can be configured to determined whether or not a coverage overlap exists between the multiple access wireless communication network and the femto cell that sent its received signal strength indicator and other quality metrics, and if so how weak or strong the overlap. As will be recognized by those ordinarily skilled, a strong overlap will typically be indicated by the return of a received signal strength indication with a low value (e.g., indicating severe interference), whereas a weak overlapped generally will be indicated by the return of a received signal strength indicator with a high value (e.g., indicating minimal interference).

Network coordination component 416 can additionally include adjustment component 610 that can be configured to modify or adapt transmission characteristics of the multiple access wireless communications network within which the base station is situated. Transmission characteristics modifiable by adjustment component 610 can include transmission parameters, such as, transmission power, frequency allocations, and the like, and through use of antenna remote electrical tilt mechanisms, the tilt and/or azimuth of the transmit and/or receive antennas.

Figure 7:
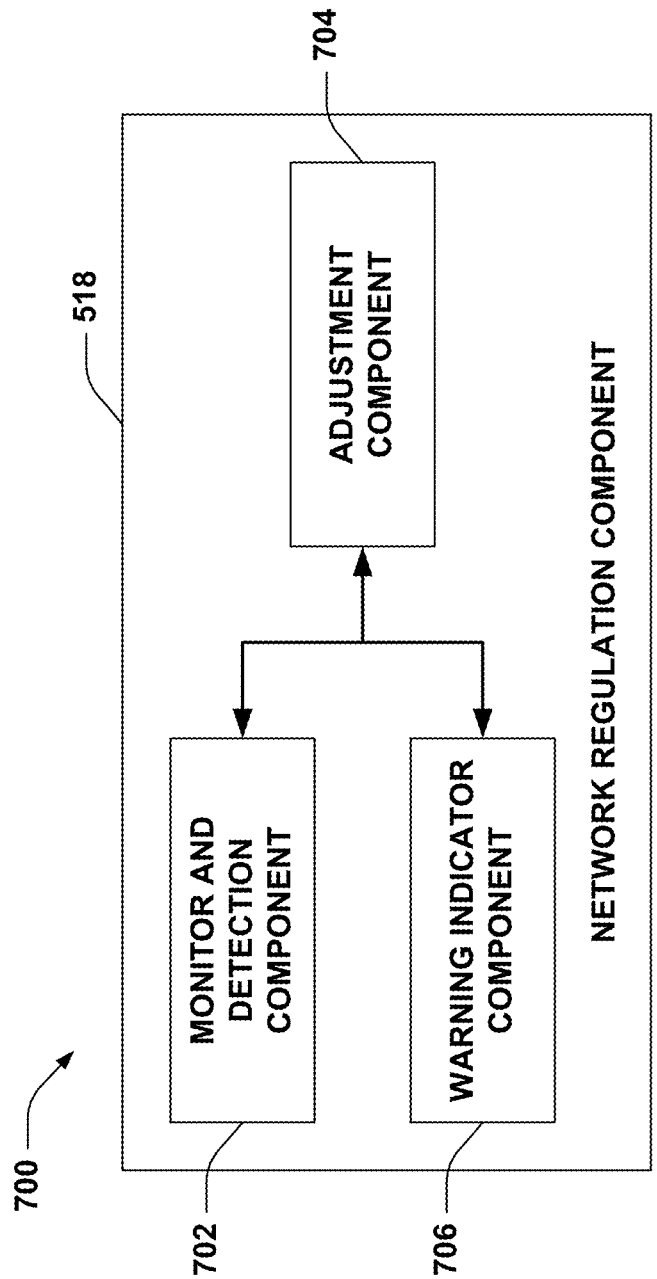
FIG. 7 shows an illustrative network regulation component associated with a femto cell.

Turning now to FIG. 7, depicted therein is an illustrative network regulation component 518 that can be included or associated with a femto cell, such as, femto cell 106. Network regulation component 518 can include monitor and detection component 702 that can monitor received signal strength indicators and other quality indicia in the coverage area circumscribed by associated antennas or distributed antennas coupled to the femto cell. Further, monitor and detection component 702 can also be configured to monitor and detect for pilot signals/beacons transmitted or broadcast from base stations positioned within the multiple access wireless communications network. Monitor and detection component 702 can be associated with a timer or clock (e.g., a generic or standard timer or a specific watchdog timer) that can be employed to ascertain the contemporaneity of pilot signal/beacons received from a plurality of base stations situated within the multiple access wireless communication system. Where monitor and detection component 702 identifies a contemporaneity or a close time correspondence in the receipt of pilot signal/beacons from a multitude of base stations requesting or soliciting the return of received signal strength indicators and/or other quality metrics, monitor and detection component 702 can aggregate the received signal strength indicator and/or other quality metrics. Thus, rather than sending a first base station and a second base station that each send pilot signals/beacons in near temporal proximity with one another each a respective received signal strength indicator and other relevant quality metrics, monitor and detection component 702 can cause the femto cell within which monitor and detection component 702 is included to return to each of the requesting base stations a total received signal strength indicator and other quality metrics.

Monitor and detection component 702, when the femto cell is associated with a distributed antenna grouping (e.g., distributed antenna array 302), can monitor and/or provide the respective received signal strength indicators and other quality metrics associated with disparate geographical coverage areas associated with each of the antennas (e.g., antennas 108A-108D) included in the distributed antenna grouping, wherein each antenna included in the distributed antenna grouping circumscribes or defines a distinct geographical area. It should be noted without limitation or loss of generality however, that while each antenna affiliated with the distributed antenna grouping can be associated with distinct non-overlapping geographical areas, there can nevertheless, be a certain degree of overlap between the circumscribed geographical coverage areas of each antenna included in the distributed antenna grouping. As will be appreciated by those of ordinary skill in the art, where such overlaps occur, any consequent inference caused by such coverage overlaps can be minimized or ameliorated by facilities and functionalities supplied by adjustment component 704.

Adjustment component 704 in addition to minimizing interference caused by coverage overlaps that can occur as a consequence of an associated distributed antenna grouping, can also adjust transmission parameters and antenna settings (e.g., tilt and azimuth) in a manner similar to that describe above in connection with base station 104. Further adjustment component 704 can also effectuate adjustments to the coverage areas controlled by femto cells where the coverage areas are in conflict with the coverage ambit provided by the multiple access wireless communications network.

Where adjustment component 704 is unable or incapable of resolving the interference caused either by coverage overlaps between the multiple access wireless communications network, or overlaps caused by diverse aspects of an associated distributed antenna grouping (e.g., distributed antenna array 302), adjustment component 704 can call on the facilities provided by warning indicator component 706.

Warning indicator component 706 in collaboration with adjustment component 704 can dispatch warning messages to system administrators that the femto cell is unable to rectify or remedy interference caused either between the multiple access wireless communication network and coverage areas under the purview and control of the femto cell or between the coverage areas associated with the distributed antenna array 302 and controlled by the femto cell. Actions that can be undertaken by, and suggest by, warning indicator component 706 can include having a system administrator adjust one or more of the antennas associated with the distributed antenna array 302 or reposition the femto cell to another location.

In the context of network coordination component 416 and/or network regulation component 518, it is to be understood that various artificial intelligence techniques can be used in conjunction with each of these components. Thus, various conditions can be intelligently determined or inferred. For example, Bayesian probabilities or confidence measures can be employed or inferences can be based upon machine learning techniques related to historical analysis, feedback, and/or previous determinations or inferences. Thus, an intelligence component (not shown) can be associated with each of network coordination component 416 and/or network regulation component 518. Such an intelligence component can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

FIGS. 8-11 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Figure 8:
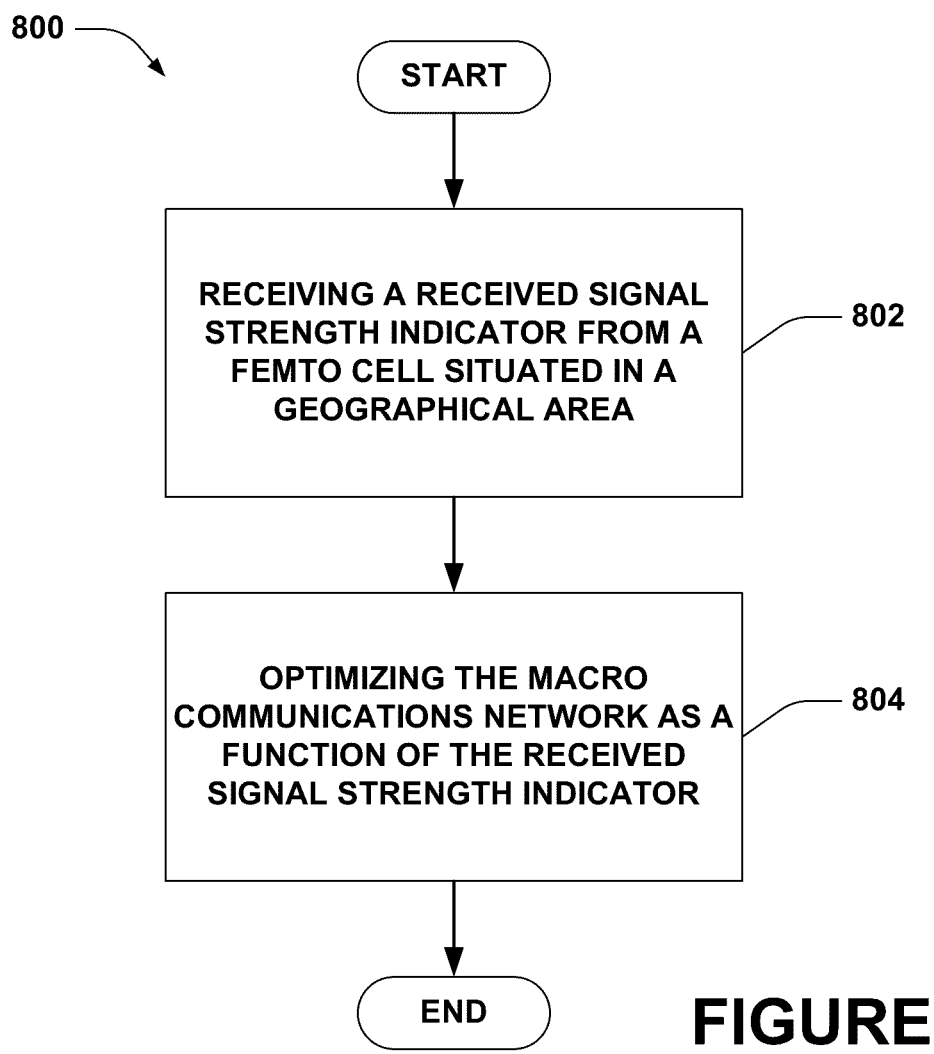
FIG. 8 depicts an illustrative flow chart utilized by a network coordination component to optimize a multiple access wireless communication network and reduce or minimize interference between coverage areas serviced by the multiple access wireless communication network and coverage areas serviced by a femto cell.

FIG. 8 provides a flowchart 800 that can be utilized by a network coordination component, such as network coordination component 416, in order to optimize a multiple access wireless communication network and reduce or minimize interference between coverage areas serviced by the multiple access wireless communication network and coverage areas serviced by a femto cell, such as femto cell 106. Method 800 can commence at 802 where a base station situated in the multiple access wireless communication network can receive a received signal strength indicator from a femto cell also located in the multiple access wireless communication network. The received signal strength indicator can be received in response to the base station transmitting or broadcasting, continuously, periodically, at randomly selected time intervals, or on demand, a pilot signal/beacon to the femto cell. The received signal strength indicator provides an indication of the degree of interference that the femto cell is experiencing at a given point in time. In addition to the received signal strength indicator the base station can also, in response to the transmitted pilot signal/beacon, receive other quality metrics from the femto cell. Such quality metrics can provide further indications regarding the broadcast environment within which the femto cell is operating.

At 804 the base station (e.g., the base station that transmitted or broadcast the pilot signal/beacon) can optimize the multiple access wireless communication network (e.g., macro network) based on the returned received signal strength indicator. The base station can optimize the multiple access wireless network by adjusting transmission characteristics extant in the multiple access network (or portions within which the femto cell is situated) so as to minimize overlaps (and thereby reduce interference) between coverage areas serviced by the multiple access wireless communication network and the coverage areas serviced by the femto cell.

Figure 9:
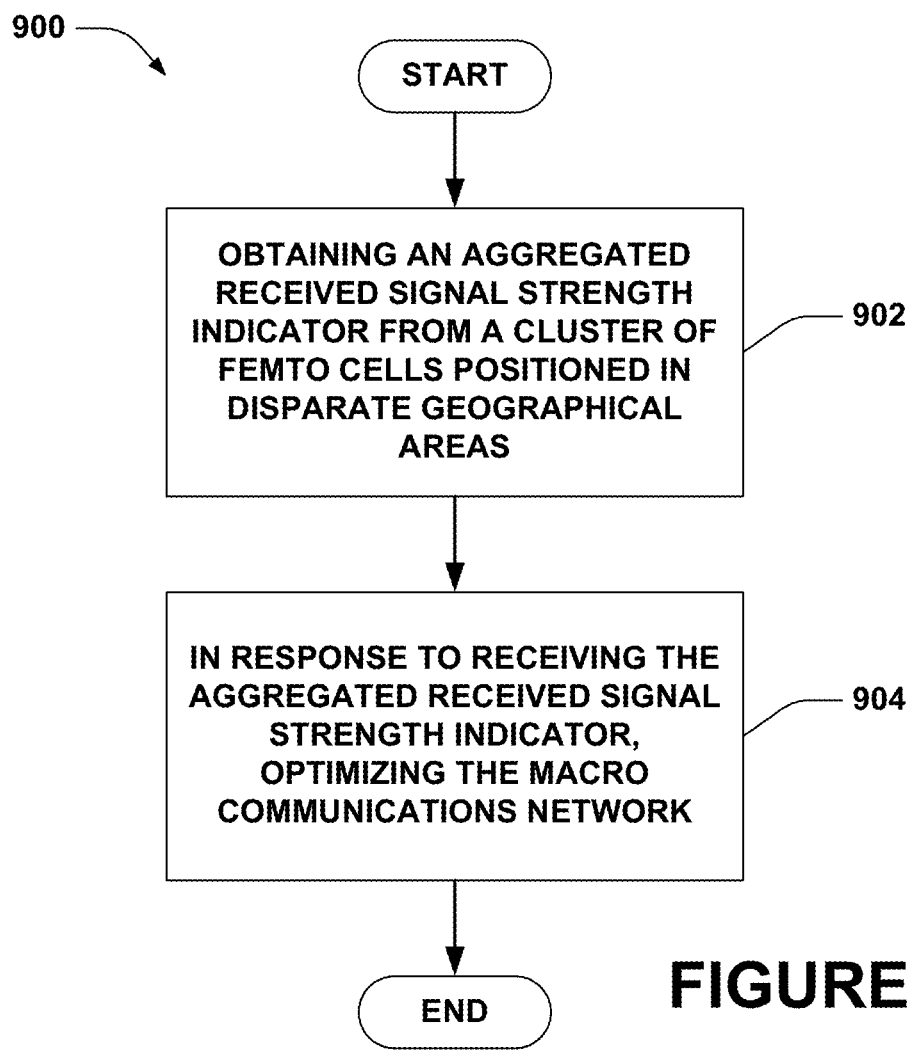
FIG. 9 depicts an illustrative flow chart utilized by a network coordination component included with a base station located in a multiple access wireless communication network.

FIG. 9 illustrates a further flowchart 900 that can be utilized by a network coordination component (e.g., network coordination component 416) included with a base station located in a multiple access wireless communication network. Method 900 can commence at 902 whereupon a base station obtains an aggregated received signal strength indicator in response to sending out a pilot signal/beacon to a femto cell. The aggregated received signal strength indicator can be dispatched to the base station when the femto cell ascertains that multiple base stations have sent a similar pilot signal/beacon in near temporal proximity or where the femto cells adjudges that a similar pilot signal/beacon from a plurality of base stations has been received contemporaneously. In response to receiving the aggregated received signal strength indicator, at 904 the base station can optimize the multiple access wireless communication network by modifying or adjusting transmission characteristics such as transmission power, frequency allocation, and the like. Additionally, the base station can optimize the multiple access wireless communications network by changing the azimuths and/or tilt angles of antennas controlled by the base station.

Figure 10:
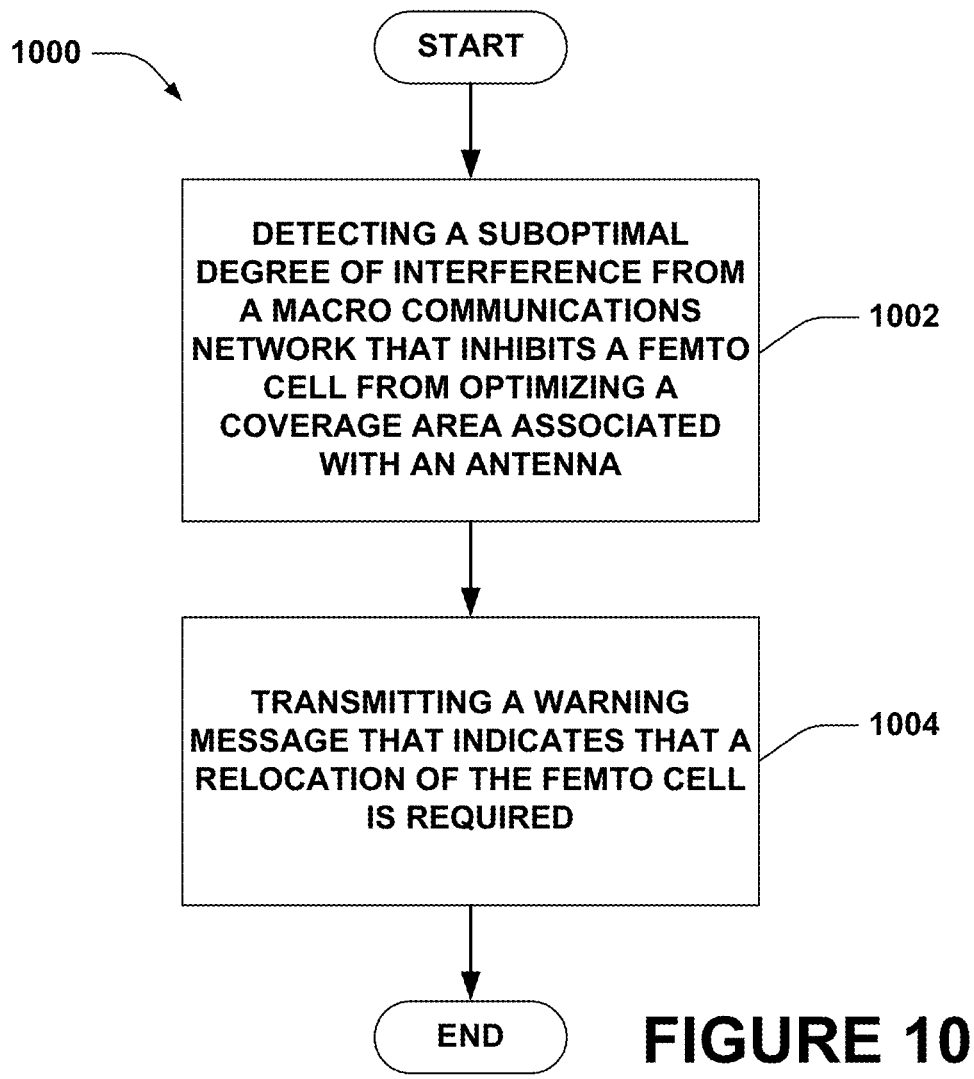
FIG. 10 illustrates a method employed by a network regulation component, wherein the network regulation component is affiliated with a femto cell.

FIG. 10 illustrates a method 1000 that can be employed by a network regulation component, such as network regulation component 518, wherein the network regulation component is affiliated with a femto cell. Method 1000 can commence at 1002 where a suboptimal degree of interference from a multiple access communications network (e.g., macro network) can be detected. The suboptimal degree of interference can typically inhibit the femto cell from optimizing a coverage area associated with one or more antennas included in an affiliated distributed antenna array, for example. In response to the detection of the suboptimal degree of interference, the femto cell, through the warning indicator component 706, for instance, can transmit to a system administrator a warning message that the femto cell needs to be relocated or that one or more of antennas associated with the distributed antenna array needs adjustment.

Figure 11:
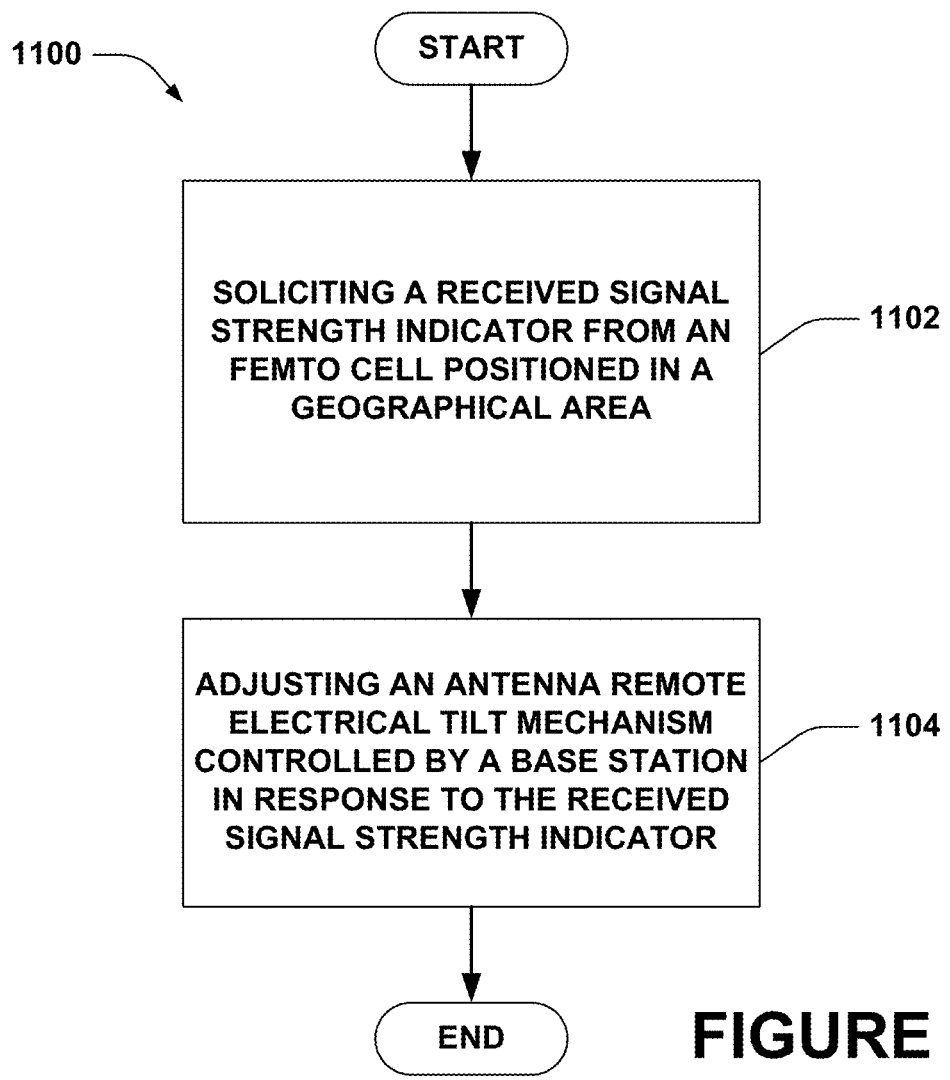
FIG. 11 depicts a process or method utilized by a network coordination component.

FIG. 11 depicts a process or method 1100 that can be utilized by a network coordination component, such as network coordination component 416. The network coordination component can be included in a base station located in a multiple access wireless communication network, such as multiple access wireless communication network 102. The method or process 1100 can commence at 1102 whereupon a base station, within which a network coordination component is included, can solicit a received signal strength indicator from a femto cell positioned in a geographical area of a multiple access wireless communication network. The base station can solicit the received signal strength indicator, as well as other pertinent quality information, by transmitting or broadcasting a pilot signal/beacon (or some other predetermined or prearranged signal) to the femto cell. On receipt of the pilot signal/beacon the femto cell can send back the requested received signal strength indicator (as well as other pertinent quality metrics). On receipt of the received signal strength indictor, and based on the received signal strength indicator, the base station at 1004, through a remote electrical tilt mechanism, can adjust the tilt angle and/or azimuth of one or more antennas controlled by the base station so as to reduce or minimize the coverage overlap between the multiple access wireless communication network and the femto cell and thereby minimize or reduce interference between the two coverage areas.

Figure 12:
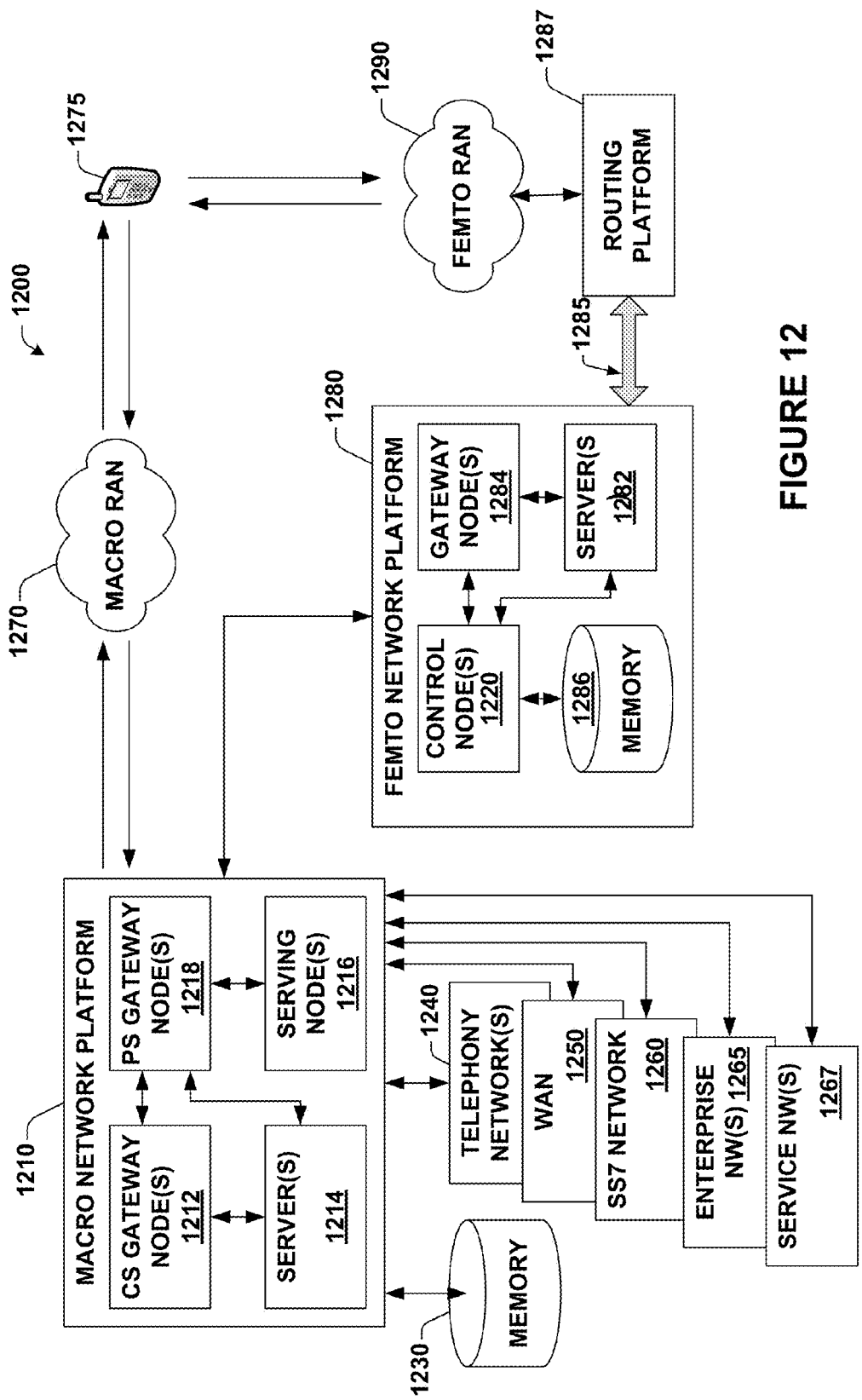
FIG. 12 illustrates an example wireless communication environment with associated components that can enable operation of an enterprise network in accordance with aspects described herein.

To provide further context for various aspects of the subject specification, FIG. 12 illustrates an example wireless communication environment 1200, with associated components that can enable operation of a femtocell enterprise network in accordance with aspects described herein. Wireless communication environment 1200 includes two wireless network platforms: (i) A macro network platform 1210 that serves, or facilitates communication) with user equipment 1275 via a macro radio access network (RAN) 1270. It should be appreciated that in cellular wireless technologies (e.g., 4G, 3GPP UMTS, HSPA, 3GPP LTE, 3GPP UMB), macro network platform 1210 is embodied in a Core Network. (ii) A femto network platform 1280, which can provide communication with UE 1275 through a femto RAN 1290, linked to the femto network platform 1280 through a routing platform 1287 via backhaul pipe(s) 1285, wherein backhaul pipe(s) are substantially the same a backhaul link 1353 below. It should be appreciated that femto network platform 1280 typically offloads UE 1275 from macro network, once UE 1275 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1270 can comprise various coverage cells like cell 1305, while femto RAN 1290 can comprise multiple femto access points. As mentioned above, it is to be appreciated that deployment density in femto RAN 1290 is substantially higher than in macro RAN 1270.

Generally, both macro and femto network platforms 1210 and 1280 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1210 includes CS gateway node(s) 1212 which can interface CS traffic received from legacy networks like telephony network(s) 1240 (e.g., public switched telephone network (PSTN), or public land mobile network (PLMN)) or a SS7 network 1260. Circuit switched gateway 1212 can authorize and authenticate traffic (e.g., voice) arising from such networks. Additionally, CS gateway 1212 can access mobility, or roaming, data generated through SS7 network 1260; for instance, mobility data stored in a VLR, which can reside in memory 1230. Moreover, CS gateway node(s) 1212 interfaces CS-based traffic and signaling and gateway node(s) 1218. As an example, in a 3GPP UMTS network, gateway node(s) 1218 can be embodied in gateway GPRS support node(s) (GGSN).

In addition to receiving and processing CS-switched traffic and signaling, gateway node(s) 1218 can authorize and authenticate PS-based data sessions with served (e.g., through macro RAN) wireless devices. Data sessions can include traffic exchange with networks external to the macro network platform 1210, like wide area network(s) (WANs) 1250; it should be appreciated that local area network(s) (LANs) can also be interfaced with macro network platform 1210 through gateway node(s) 1218. Gateway node(s) 1218 generates packet data contexts when a data session is established. To that end, in an aspect, gateway node(s) 1218 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1214. It is to be noted that in 3GPP UMTS network(s), gateway node(s) 1218 (e.g., GGSN) and tunnel interface (e.g., TTG) comprise a packet data gateway (PDG).

Macro network platform 1210 also includes serving node(s) 1216 that convey the various packetized flows of information or data streams, received through gateway node(s) 1218. As an example, in a 3GPP UMTS network, serving node(s) can be embodied in serving GPRS support node(s) (SGSN).

As indicated above, server(s) 1214 in macro network platform 1210 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1210. Data streams can be conveyed to gateway node(s) 1218 for authorization/authentication and initiation of a data session, and to serving node(s) 1216 for communication thereafter. Server(s) 1214 can also effect security (e.g., implement one or more firewalls) of macro network platform 1210 to ensure network's operation and data integrity in addition to authorization and authentication procedures that CS gateway node(s) 1212 and gateway node(s) 1218 can enact. Moreover, server(s) 1214 can provision services from external network(s), e.g., WAN 1250, or Global Positioning System (GPS) network(s) (not shown). It is to be noted that server(s) 1214 can include one or more processor configured to confer at least in part the functionality of macro network platform 1210. To that end, the one or more processor can execute code instructions stored in memory 1230, for example.

In example wireless environment 1200, memory 1230 stores information related to operation of macro network platform 1210. Information can include business data associated with subscribers; market plans and strategies, e.g., promotional campaigns, business partnerships; operational data for mobile devices served through macro network platform; service and privacy policies; end-user service logs for law enforcement; and so forth. Memory 1230 can also store information from at least one of telephony network(s) 1240, WAN(s) 1250, or SS7 network 1260, enterprise NW(s) 1265, or service NW(s) 1267.

Femto gateway node(s) 1284 have substantially the same functionality as PS gateway node(s) 1218. Additionally, femto gateway node(s) 1284 can also include substantially all functionality of serving node(s) 1216. In an aspect, femto gateway node(s) 1284 facilitates handover resolution, e.g., assessment and execution. Further, control node(s) 1220 can receive handover requests and relay them to a handover component (not shown) via gateway node(s) 1284. According to an aspect, control node(s) 1220 can support RNC capabilities.

Server(s) 1282 have substantially the same functionality as described in connection with server(s) 1214. In an aspect, server(s) 1282 can execute multiple application(s) that provide service (e.g., voice and data) to wireless devices served through femto RAN 1290. Server(s) 1282 can also provide security features to femto network platform. In addition, server(s) 1282 can manage (e.g., schedule, queue, format . . . ) substantially all packetized flows (e.g., IP-based, frame relay-based, ATM-based) it generates in addition to data received from macro network platform 1210. It is to be noted that server(s) 1282 can include one or more processor configured to confer at least in part the functionality of macro network platform 1210. To that end, the one or more processor can execute code instructions stored in memory 1286, for example.

Memory 1286 can include information relevant to operation of the various components of femto network platform 1280. For example operational information that can be stored in memory 1286 can comprise, but is not limited to, subscriber information; contracted services; maintenance and service records; femto cell configuration (e.g., devices served through femto RAN 1290; access control lists, or white lists); service policies and specifications; privacy policies; add-on features; and so forth.

It is noted that femto network platform 1280 and macro network platform 1210 can be functionally connected through one or more reference link(s) or reference interface(s). In addition, femto network platform 1280 can be functionally coupled directly (not illustrated) to one or more of external network(s) 1240, 1250, 1260, 1265 or 1267. Reference link(s) or interface(s) can functionally link at least one of gateway node(s) 1284 or server(s) 1286 to the one or more external networks 1240, 1250, 1260, 1265 or 1267.

Figure 13:
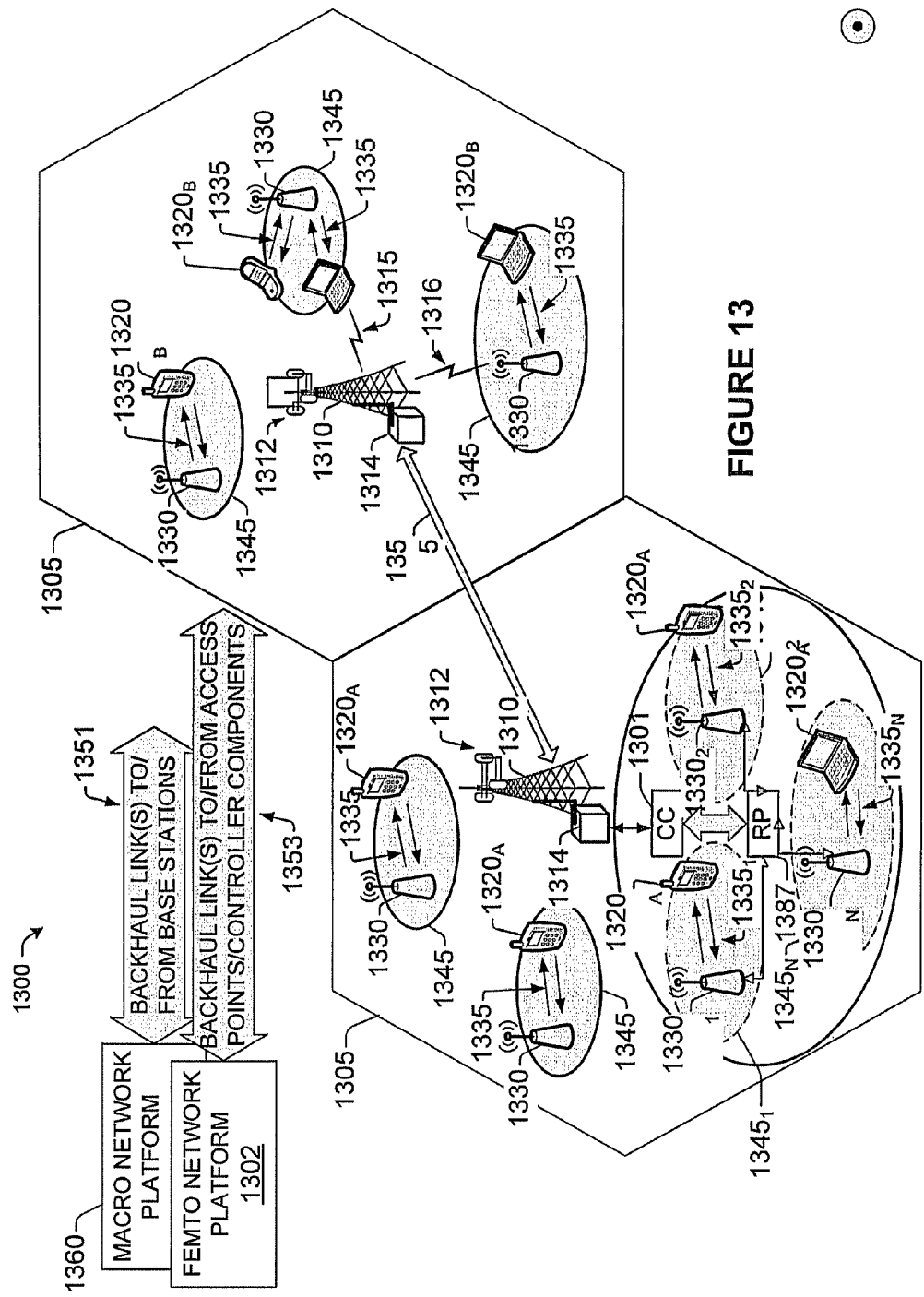
FIG. 13 illustrates a schematic deployment of a macro cell for wireless coverage in accordance with aspects of the subject specification.

FIG. 13 illustrates a wireless environment that includes macro cells and femtocells for wireless coverage in accordance with aspects described herein. In wireless environment 1350, two areas 1305 represent "macro" cell coverage; each macro cell is served by a base station 1310. It can be appreciated that macro cell coverage area 1305 and base station 1310 can include functionality, as more fully described herein, for example, with regard to system 1300. Macro coverage is generally intended to serve mobile wireless devices, like UE $1320_A$, $1320_B$, in outdoors locations. An over-the-air wireless link 1315 provides such coverage, the wireless link 1315 comprises a downlink (DL) and an uplink (UL), and utilizes a predetermined band, licensed or unlicensed, of the radio frequency (RF) spectrum. As an example, UE $1320_A$, $1320_E$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1310 communicates via backhaul link(s) 1351 with a macro network platform 1360, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1360 controls a set of base stations 1310 that serve either respective cells or a number of sectors within such cells. Base station 1310 comprises radio equipment 1314 for operation in one or more radio technologies, and a set of antennas 1312 (e.g., smart antennas, microwave antennas, satellite dish(es) . . . ) that can serve one or more sectors within a macro cell 1305. It is noted that a set of radio network control node(s), which can be a part of macro network platform; a set of base stations (e.g., Node B 1310) that serve a set of macro cells 1305; electronics, circuitry or components associated with the base stations in the set of base stations; a set of respective OTA wireless links (e.g., links 1315 or 1316 operated in accordance to a radio technology through the base stations; and backhaul link(s) 1355 and 1351 form a macro radio access network (RAN). Macro network platform 1360 also communicates with other base stations (not shown) that serve other cells (not shown). Backhaul link(s) 1351 or 1353 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1355 link disparate base stations 1310. According to an aspect, backhaul link 1353 can connect multiple femto access points 1330 and/or controller components (CC) 1301 to the femto network platform 1302. In one example, multiple femto APs can be connected to a routing platform (RP) 1387, which in turn can be connect to a controller component (CC) 1301. Typically, the information from UEs 1320$_A$ can be routed by the RP 1387, for example, internally, to another UE 1320$_A$ connected to a disparate femto AP connected to the RP 1387, or, externally, to the femto network platform 1302 via the CC 1301, as discussed in detail supra.

In wireless environment 1350, within one or more macro cell(s) 1305, a set of femtocells 1345 served by respective femto access points (APs) 1330 can be deployed. It can be appreciated that, aspects of the subject innovation are geared to femtocell deployments with substantive femto AP density, e.g., $10^4$-$10^7$ femto APs 1330 per base station 1310. According to an aspect, a set of femto access points 1330$_1$-1330$_N$, with N a natural number, can be functionally connected to a routing platform 1387, which can be functionally coupled to a controller component 1301. The controller component 1301 can be operationally linked to the femto network platform 330 by employing backhaul link(s) 1353. Accordingly, UE 1320$_A$ connected to femto APs 1330$_1$-1330$_N$ can communicate internally within the femto enterprise via the routing platform (RP) 1387 and/or can also communicate with the femto network platform 1302 via the RP 1387, controller component 1301 and the backhaul link(s) 1353. It can be appreciated that although only one femto enterprise is depicted in FIG. 13, multiple femto enterprise networks can be deployed within a macro cell 1305.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

Figure 14:
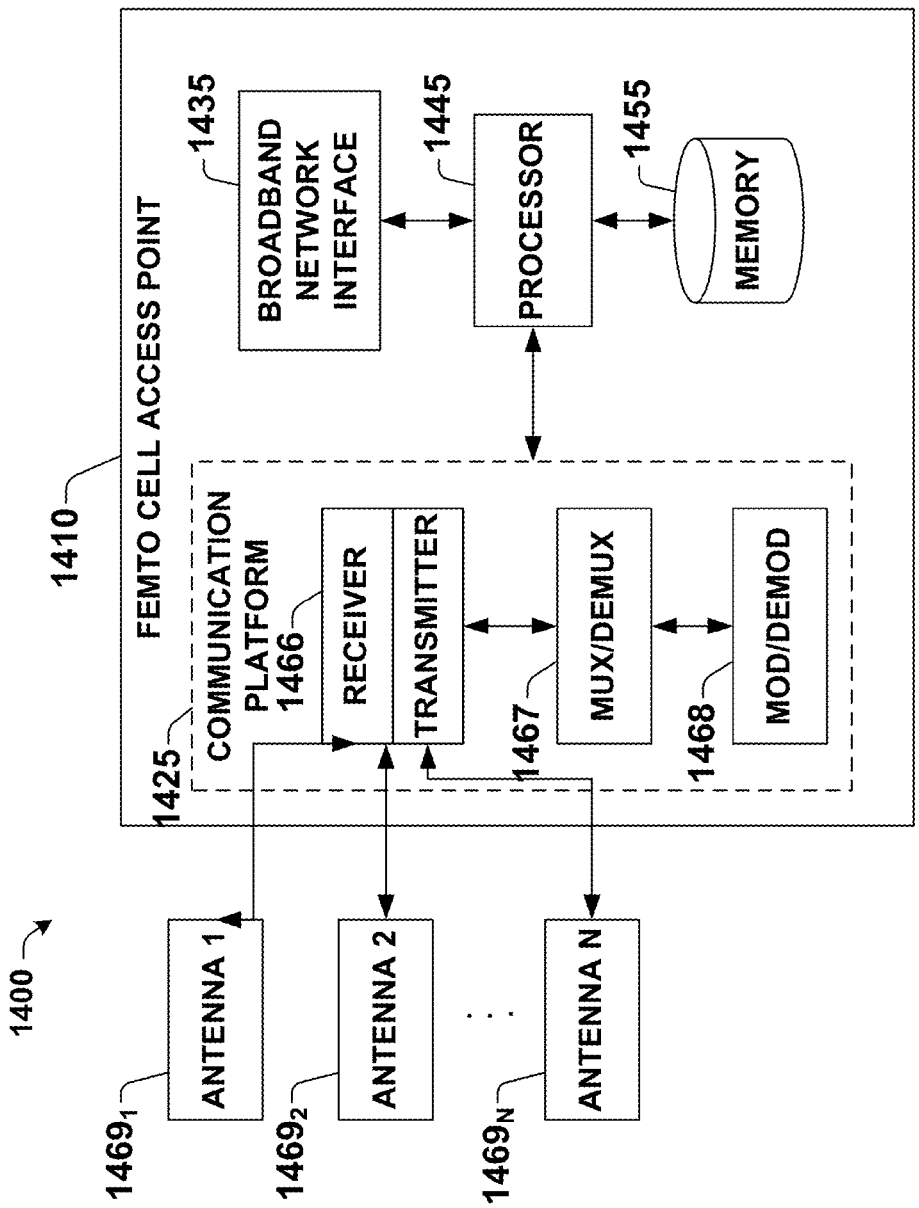
FIG. 14 illustrates a block diagram of an example embodiment of a femtocell access point.

With respect to FIG. 14, in example embodiment 1400, femtocell AP 1410 can receive and transmit signal(s) (e.g., traffic and control signals) from and to wireless devices, access terminals, wireless ports and routers, etc., through a set of antennas 1469$_1$-1469$_N$. It should be appreciated that while antennas 1469$_1$-1469$_N$ are a part of communication platform 1425, which comprises electronic components and associated circuitry that provides for processing and manipulating of received signal(s) (e.g., a packet flow) and signal(s) (e.g., a broadcast control channel) to be transmitted. In an aspect, communication platform 1425 includes a transmitter/receiver (e.g., a transceiver) 1466 that can convert signal(s) from analog format to digital format upon reception, and from digital format to analog format upon transmission. In addition, receiver/transmitter 1466 can divide a single data stream into multiple, parallel data streams, or perform the reciprocal operation. Coupled to transceiver 1466 is a multiplexer/demultiplexer 1467 that facilitates manipulation of signal in time and frequency space. Electronic component 1467 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1467 can scramble and spread information (e.g., codes) according to substantially any code known in the art; e.g., Hadamard-Walsh codes, Baker codes, Kasami codes, polyphase codes, and so on. A modulator/demodulator 1468 is also a part of operational group 1425, and can modulate information according to multiple modulation techniques, such as frequency modulation, amplitude modulation (e.g., M-ary quadrature amplitude modulation (QAM), with M a positive integer), phase-shift keying (PSK), and the like.

FAP 1410 also includes a processor 1445 configured to confer functionality, at least partially, to substantially any electronic component in the femto access point 1410, in accordance with aspects of the subject innovation. In particular, processor 1445 can facilitate FAP 1410 to implement configuration instructions received through communication platform 1425, which can include storing data in memory 1455. In addition, processor 1445 facilitates FAP 1410 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1445 can manipulate antennas 1469$_1$-1469$_N$ to facilitate beamforming or selective radiation pattern formation, which can benefit specific locations (e.g., basement, home office . . . ) covered by FAP; and exploit substantially any other advantages associated with smart-antenna technology. Memory 1455 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1455 can store configuration information such as schedules and policies; FAP address(es) or geographical indicator(s); access lists (e.g., white lists); license(s) for utilization of add-features for FAP 1410, and so forth.

In embodiment 1400, processor 1445 is coupled to the memory 1455 in order to store and retrieve information necessary to operate and/or confer functionality to communication platform 1425, broadband network interface 1435 (e.g., a broadband modem), and other operational components (e.g., multimode chipset(s), power supply sources . . . ; not shown) that support femto access point 1410. In addition, it is to be noted that the various aspects disclosed in the subject specification can also be implemented through (i) program modules stored in a computer-readable storage medium or memory (e.g., memory 1386 or memory 1455) and executed by a processor (e.g., processor 1445), or (ii) other combination(s) of hardware and software, or hardware and firmware.

Figure 15:
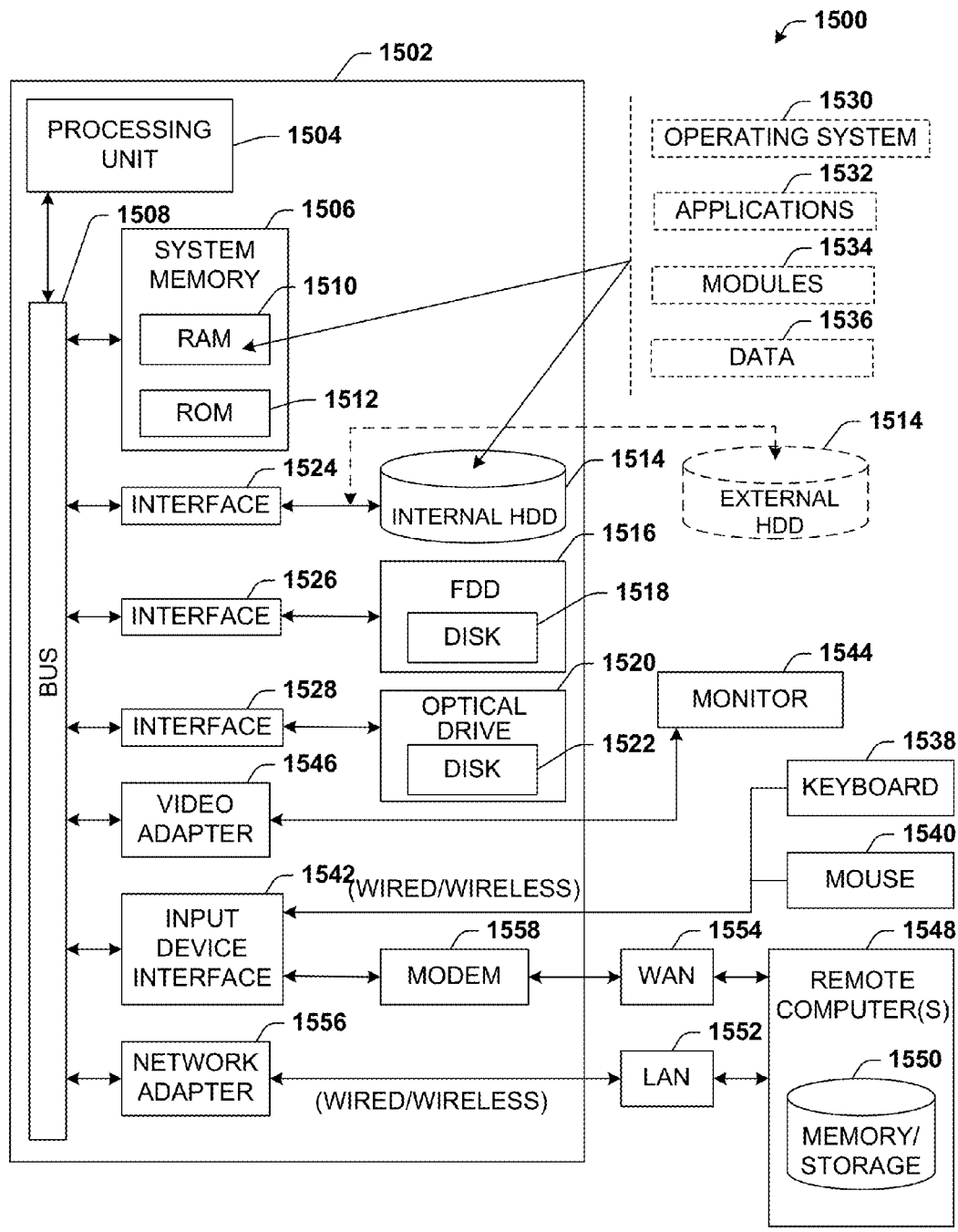
FIG. 15 illustrates a block diagram of a computer operable to execute a portion of the disclosed architecture.

Referring now to FIG. 15, there is illustrated a block diagram of an exemplary computer system operable to execute the disclosed architecture. In order to provide additional context for various aspects of the disclosed subject matter, FIG. 15 and the following discussion are intended to provide a brief, general description of a suitable computing environment 1500 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 15, the exemplary environment 1500 for implementing various aspects of the disclosed subject matter includes a computer 1502, the computer 1502 including a processing unit 1504, a system memory 1506 and a system bus 1508. The system bus 1508 couples to system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is appreciated that the disclosed subject matter can be implemented with various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, a mobile device, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which may connect to a global communications network, e.g., the Internet.

When used in a LAN networking environment, the computer 1502 is connected to the local network 1552 through a wired and/or wireless communication network interface or adapter 1556. The adapter 1556 may facilitate wired or wireless communication to the LAN 1552, which may also include a wireless access point disposed thereon for communicating with the wireless adapter 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11(a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 15 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A system, comprising:
    a processor; and
    a memory that stores executable instructions that, when executed by the processor, facilitate performance of operations, comprising:
        detecting, as a function of obtaining an indicator representing an aggregation of resource reservation control indicators, interference from a network device of a communication network, wherein the interference is determined to be preventing a femto cell device from modifying a broadcast area associated with transmissions of the femto cell device, and wherein a compilation of the aggregation is performed in response to the femto cell device being determined to have received a first beacon signal from a first base station device and a second beacon signal from a second base station device within a defined time period as measured by a watchdog timer;
        determining a location where the interference from the network device is reduced; and
        initiating transmission of message data representing a message to relocate the femto cell device from an initial location to the location.

2. The system of claim 1, wherein the operations further comprise monitoring the interference from the network device as a function of a signal strength indicator.

3. The system of claim 1, wherein the operations further comprise monitoring the interference from the network device as a function a metric measuring a quality of service.

4. The system of claim 1, wherein the initiating the transmission comprises initiating transmission of another message that indicates that a radio parameter associated with the femto cell device is to be adjusted.

5. The system of claim 1, wherein the operations further comprise, as a function of a radio parameter, facilitating tilting of an antenna of a distributed antenna array employed by the femto cell device.

6. The system of claim 1, wherein the operations further comprise, as a function of a radio parameter, adjusting a transmission power employed by the femto cell device.

7. The system of claim 1, wherein the operations further comprise, as a function of a radio parameter, adjusting a frequency allocation employed by the femto cell device.

8. The system of claim 1, wherein the operations further comprise, as a function of a radio parameter, adjusting a code sequence employed by the femto cell device.

9. The system of claim 1, wherein the operations further comprise reconfiguring the femto cell device as a function of the message data.

10. A method, comprising:
    monitoring, by a system comprising a processor, interference from a network device of a communication network as a function of a signal strength indicator, wherein the interference is determined to be preventing a femto cell device from adjusting a coverage area associated with the femto cell device, and wherein the femto cell device is located within a broadcast range of the network device, and wherein the signal strength indicator represents an aggregation of signal strength indicators compiled in response to the femto cell device receiving from multiple base station devices, within a defined period of time and as determined by a system clock, respective pilot signals requesting return of the signal strength indicator;
    determining, by the system, a location where the interference from the network device is reduced; and
    initiating, by the system, a broadcast of a message that indicates a request that the femto cell device is to be relocated from an initial location to the location.

11. The method of claim 10, wherein the signal strength indicator is received from the femto cell device in response to a first pilot signal being broadcast by a first base station device and a second pilot signal being broadcast by a second base station device.

12. The method of claim 10, further comprising adjusting, by the system, a transmission power with which the network device transmits with respect to the broadcast range based on the signal strength indicator from the femto cell device.

13. The method of claim 10, further comprising adjusting, by the system, a parameter associated with the network device as a function of an output from an operation support system device that enables a reduction in interference caused by the network device with respect to the broadcast range of the network device.

14. The method of claim 10, further comprising adjusting, by the system, a frequency allocation employed by the network device to transmit with respect to the broadcast range of the network device in response to receiving the signal strength indicator from the femto cell device.

15. The method of claim 10, further comprising adjusting, by the system, a frequency allocation utilized by the network device to transmit with respect to the broadcast range of the network device via a cell planning process that facilitates a reduction of a portion of the interference caused by the network device transmitting.

16. The method of claim 10, further comprising initiating, by the system, adjustment of an azimuth of an antenna associated with the femto cell device that receives a transmission from the network device.

17. The method of claim 16, further comprising instructing, by the system, a remote electrical tilt device to adjust the azimuth of the antenna associated with the femto cell device.

18. A non-transitory machine-readable storage medium comprising executable instructions that, when executed by a processor, facilitate performance of operations, comprising:
 detecting interference from a first network device as a function of a signal strength indicator representative of an aggregation of signal strength indicators, wherein the interference prevents a femto cell device from adjusting a coverage area associated with the femto cell device, and wherein the aggregation of signal strength indicators is compiled by the femto cell device in response to having received a first pilot signal from the first network device and a second pilot signal from a second network device within a defined time period as determined by a watchdog timer;
 determining a location where the network device causes a reduction in interference to the femto cell device; and
 sending message data representing a message requesting the femto cell device be relocated from an initial location to the location.

19. The non-transitory machine readable storage medium of claim 18, wherein the first network device is a base station device that receives the signal strength indicator from the femto cell device in response to the first network device having broadcast a pilot signal, and wherein the femto cell device has recognized the pilot signal as comprising a command to return the signal strength indicator to the first network device.

20. The non-transitory machine readable storage medium of claim 18, wherein the femto cell device is associated with a distributed antenna array comprising geographically distributed antennas and wherein the femto cell determines respective signal strength indicators for respective ones of the geographically distributed antennas.

* * * * *